US005252169A

United States Patent [19]

Bechmann

[11] Patent Number: 5,252,169

[45] Date of Patent: Oct. 12, 1993

[54] METHOD AND A DEVICE OF STRIPPING LAMINATED FOIL CUTTINGS

[76] Inventor: Peter Bechmann, Auweg 3, D-8114 Uffing/Staffelsee, Fed. Rep. of Germany

[21] Appl. No.: 869,665

[22] Filed: Apr. 16, 1992

[30] Foreign Application Priority Data

Apr. 19, 1991 [DE] Fed. Rep. of Germany ....... 4112887

[51] Int. Cl.[5] ........ B32B 15/00

[52] U.S. Cl. ........ 156/344; 156/85; 156/380.9; 156/499; 156/584; 156/250; 156/510

[58] Field of Search ........ 156/248, 85, 344, 380.9, 156/499, 584, 250, 510

[56] References Cited

U.S. PATENT DOCUMENTS

| | | | |
|---|---|---|---|
| 3,695,981 | 10/1972 | Boucris | 156/510 |
| 4,724,032 | 2/1988 | Kay | 156/344 |
| 4,834,826 | 5/1989 | Abe et al. | 156/344 |
| 4,855,012 | 8/1989 | Sumi | 156/584 |
| 4,867,836 | 9/1989 | Hamamura et al. | 156/584 |
| 4,880,488 | 11/1989 | Matsuo et al. | 156/344 |
| 4,897,148 | 1/1990 | Orlandi | 156/584 |
| 5,104,473 | 4/1992 | Tveit et al. | 156/268 |

FOREIGN PATENT DOCUMENTS 2212995 4/1976 Fed. Rep. of Germany .

*Primary Examiner*—David A. Simmons
*Assistant Examiner*—Paul M. Rivard
*Attorney, Agent, or Firm*—Ratner & Prestia

[57] ABSTRACT

A method of stripping laminated foil cuttings includes a transportation device for transporting the foil cuttings in a given transportation direction. A cutting device for cutting the forward edge of each foil cutting with an obtuse angle is arranged upstream of a deflection edge along the transportation direction. At the deflection edge, a foil remainder of a cover foil of each laminated foil cutting, provided adjacent to incisions of the cover foil, is removed in a branched off transfer direction from a carrier paper of each foil cutting. The carrier paper is removed in a transportation direction in common with an advertising print or a commercial art as formed by such incisions in the cover foil and remaining on the carrier paper at the deflection edge.

10 Claims, 1 Drawing Sheet

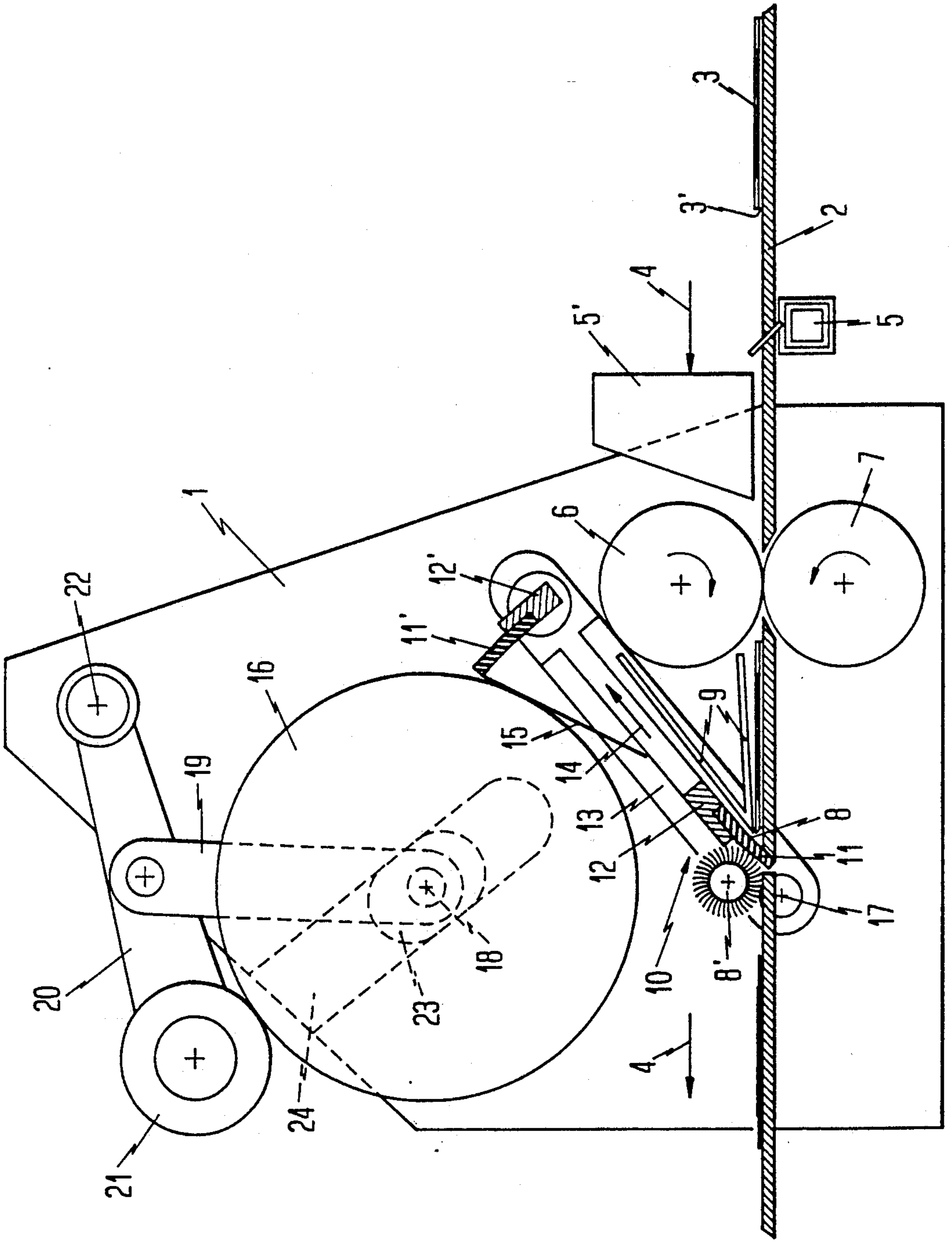
1
2
3
3'
4
5
5'
6
7
8
8'
9
10
11
11'
12
12'
13
14
15
16
17
18
19
20
21
22
23
24

METHOD AND A DEVICE OF STRIPPING LAMINATED FOIL CUTTINGS

BACKGROUND OF THE INVENTION

The present invention relates to a method and a device of stripping laminated foil cuttings formed with incisions in a cover foil which is adhered to a carrier paper by means of a self-adhesive bottom layer. The incisions form an advertising print or a commercial art that is designed for application in a self-adhesive manner to an advertising space.

In the manufacturing of so-called foil prints, a foil material is used which is generally cut to the size of a sheet or a piece and comprises a very thin and therefore extremely pliant foil. The foil may be a rolled or also a cast material that is in any case shrinkable and used as a cover foil which is laminated to a carrier paper by means of a self-adhesive bottom layer. The mostly colored cover foil of the individual foil cuttings is formed with advertising prints or commercial arts as individually designed according to specific guidelines whereby the formation thereof is mostly computer controlled and practiced by means of special contouring knives and sometimes also by means of heating wires or a laser beam.

In order to apply an advertising print or a commercial art, formed in the cover foil of such foil cuttings, to an advertising space by means of its self-adhesive bottom layer, it becomes necessary to first remove from the carrier paper of each foil cutting the foil remainder which is adjacent to the incisions of the cover foil. The removal of such a foil remainder is known as "stripping of laminated foil cuttings" since thereby the advertising print or the commercial art is exposed by virtue of it remaining on the carrier paper.

Any stripping of laminated foil cuttings has so far been practiced only manually. Such a practice involves the difficulty of neatly separating the foil remainder at the incisions from the contours of the advertising print or the commercial art which remains on the carrier paper. With this separation, no damaging of the contours occurs which likely occurs when the characters composing an advertising print are individually represented or when the commercial art shows a complicated contour or its incisions with multiple varying directional changes. A correspondingly careful handling of the foil cuttings with a high craft skill is required for obtaining perfect advertising prints and commercial arts. Thus, it should be recognized that such a stripping of laminated foil cuttings as so far practiced manually is very expensive.

In a method of manufacturing self-adhesive labels as known from DT 22 12 995 C3, a carrier band having on its surface a label material in common with a self-adhesive layer is guided through a punching station intermediate between a take-off roller and a take-up roller for a punching of labels in the label material. With this punching of labels, a punching grid is formed at the same time which is pulled off by means of a deflection roller from the carrier band and taken up on a separate remainder roller at a position upstream of the take-up roller for the carrier band and its labels remaining thereon. With this continuously practiced method, no particular difficulties therefore exist in respect to the pulling off from the carrier band of the punching grid which is formed during the punching of the labels due to the greater thickness of the layer of the label material. Also, damage of the labels remaining on the carrier band is prevented because the labels also provide a correspondingly higher flexural strength due to this greater thickness of the layer of the label material, which accordingly better resists the separating forces that occur on the contours of the labels when the punching grid is being pulled off.

SUMMARY OF THE INVENTION

The present invention deals with the object of providing a method and a device for stripping laminated foil cuttings which will allow to practice the removal from the carrier paper of the foil remainder under an utmost careful treatment of the advertising print or the commercial art remaining on the carrier paper. The invention can be practiced mechanically by simple means and be accordingly less expensive.

In accordance with an embodiment of the present invention, the stripping of laminated foil cuttings is carried out by a transportation means for transporting each foil cutting in a given transportation direction; in this given transportation direction of the foil cuttings, a cutting means is arranged and provided for cutting a forward edge of each foil cutting with an obtuse angle as inclined in such a manner that the upper surface of the cover foil projects forwardly relative to the lower surface of the carrier paper of each foil cutting as seen in the given transportation direction; downstream of the cutting means, a branch point of the transportation direction is provided and formed with a deflection edge in such a manner that the foil remainder is pulled off from the carrier paper at the deflection edge as assisted by a cooperative transfer means acting on the inclined forward cutting edge of each foil cutting. The foil remainder is further transported in a transfer direction as branched off from said given transportation direction for being taken over by a remainder roller. The carrier paper of the foil cutting is removed in the given transportation direction together with the advertising print or the commercial art remaining thereon at the branch point.

BRIEF DESCRIPTION OF THE DRAWING

An embodiment of the device according to the present invention is schematically shown in the drawing and will now be in more detail.

DETAILED DESCRIPTION OF THE INVENTION

The device which is designed for stripping laminated foil cuttings comprises a stand 1 holding a transportation table 2. The transportation table 2 is provided as a support for foil cuttings 3 having the size of a sheet or a piece and for their successive transport in a given transportation direction 4. Each foil cutting 3 comprises a cover foil which is adhered to a carrier paper by means of a self-adhesive bottom layer. The cover foil is provided with incisions forming an advertising print or a commercial art which remains on the carrier paper when the foil remainder of the cover foil adjacent to the incisions is removed from the carrier paper. The removal of the foil remainder of such laminated foil cuttings is known as "stripping" because the advertising print or the commercial art remaining on the carrier paper of each foil cutting is thereby exposed or "stripped" for its later application to an advertising space in a self-adhesive manner.

For allowing a simple removal of the foil remainder from the carrier paper of each foil cutting 3, the forward edge 3' of the same is first cut by means of a cutting means 5. The cutting is formed with an obtuse angle as inclined to the transportation direction 4 so that the upper surface of the cover foil projects forwardly in the transportation direction further than the lower surface of the carrier paper resting on the transportation table 2. After this inclined cutting of the forward edge 3' has been performed, the foil cutting 3 is being moved into the transportation gap of two feeding rollers 6, 7 which are rotatably supported on the stand 1 and synchronously driven for the further transportation of the foil cuttings.

Downstream of the two feeding rollers 6, 7 a deflection edge 8 is provided with the peak point of an angled baffle plate 9 for pulling off the foil remainder of the cover foil from the carrier paper in co-operation with a transfer means 10. With this "stripping" the advertising print or the commercial art as formed by incisions of the cover foil remains on the carrier paper which is removed in the given transportation direction 4 downstream of said deflection edge 8.

The transfer means 10 is formed with a rubber elastic pad 11 which is mounted on a transfer slide 12. The transfer slide 12 is moveable along a guide rail 13 which accordingly defines the transfer direction 14 which is branched off from the given transportation direction 4 at the deflection edge 8. The foil remainder is pulled off from the carrier paper of each foil cutting 3 in this branched off transfer direction. This removal from the carrier paper of the foil remainder is obtained in such a manner that the rubber elastic pad 11 is initially adjusted to a position relative to the deflecting edge 8 that when a foil cutting arrives, the cover foil of the same will be first contacted with the pad 11. As a result of the inclination of its forward edge 3' as obtained by means of the cutting means 5, the cover foil will reach a line contact with the pad 11 so that with a subsequently initial movement of the transfer slide 12 in the branched off transfer direction 14, the edge portion of the cover foil which is directly adjacent to this inclination will be adhered to the pad 11 through its self-adhesive bottom layer. This adhering of the forward edge portion of the cover foil to the pad 11 will subsequently be assisted by its co-operation with the deflection edge 8 and also by its co-operation with the baffle plate 9. During the continuous movement of the transfer slide 12 in the transfer direction 14, the foil remainder 15 of the foil cutting 3 which is next to this forward edge portion will then be securely pulled off from the carrier paper. At the same time, the carrier paper is removed in the given transportation direction 4 in common with the advertising print or the commercial art which remains thereon during this "stripping" of the foil cutting.

Whereas the co-operation of the deflection edge 8 with the transfer means 10 secures a safe pulling off of the foil remainder 15 without any risk of damaging the advertising print or the commercial art remaining on the carrier paper of each foil cutting, it is advisable to additionally arrange a brush 8' in the vicinity of the deflection edge 8. Brush 8' acts on the cover foil of each foil cutting in such a manner as to assist the separation of the foil remainder from the advertising print or the commercial art during the removal of the foil remainder. It is further advisable to arrange in the vicinity of the cutting means 5 a heating channel 5'for causing a shrinkage of the cover foil prior to the removal of the foil remainder and to thereby enlarge the cutting width of the incisions forming the advertising print or the commercial art. With this measure as well the removal of the foil remainder from the carrier paper is assisted at its start at the deflection edge. Such an enlarged cutting width of the incisions forming the advertising print or the commercial art may of course also be obtained by using contouring knives having correspondingly formed wider cutting edges, the use of which, however, is only very rarely possible in view of the mostly rather complicated contours of an advertising print or a commercial art.

The transfer means 10 is moveable along the guide rail 13 until it reaches a final position in which the foil remainder 15 which is adhered to the pad 11 with its forward edge portion is transferred to a remainder roller 16. The transfer is obtained such that the transfer slide 12 which for this final position is shown with its relative position 12' is turned around an axis parallel to the rotational axis of the remainder roller 16. With this turning of the transfer slide, the pad 11' is also brought into a relatively changed position in respect to the remainder roller 16 so that the foil remainder 15 now may be contacted it its self-adhesive bottom layer with the remainder roller 16. When the remainder roller 16 is subsequently rotated after the forward edge portion of the foil remainder 15 has been brought into contact during a momentary stand-still of the transfer slide, the foil remainder 15 will thereby be taken up on the remainder roller 16 and will be continuously adhered to the remainder roller through its self-adhesive bottom layer. For assisting this adhering, it is advisable to turn the guide rail 13 around an axis 17 in the vicinity of the deflection edge 8. This turning of the guide rail 13 may also be used for the co-operation of the transfer slide 12 and its pad 11 with the deflection edge 8 at the time when the foil remainder 15 is being taken over at the branch point of the transportation direction 4 of the foil cuttings.

The remainder roller 16 is supported with its rotational axis 18 on an individual link 19 of a link arrangement which further comprises a second individual link 20 for rotatably supporting a driving roller 21 which is in contact with the enveloping surface of the remainder roller 16. The link arrangement as formed with the two individual links 19, 20 is supported on the stand 1 by means of the rotational axis 22 of the individual link 20. The rotational axis 18 of the remainder roller 16 may be moved by means of a crosshead 23 along a guide slot 24 which is angularly extended relative to the guide rail 13 of the transfer means 10. This possibility of movement of the rotational axis 18 secures the maintenance of a constant driving transmission for the driving roller 21 in respect to the transportation speed of the foil cuttings 3 under consideration of a growing diameter of the remainder roller 16 during its filling with the foil remainders. The guide slot 24 is further provided with an open end so that the remainder roller 16 may be removed after having obtained a predetermined filling and therefore also a predetermined maximum diameter and may subsequently be replaced by an empty new remainder roll.

The different driving mechanisms (not shown in the drawing) for an actuation of the cutting means 5 as synchronized with the feeding of the foil cuttings 3, for a rotation of the feeding rollers 6, 7, for a reciprocating movement of the transfer slide 12, for a turning of the guide rail 13 as optionally provided, and for a drive of the driving roller 21 and the remainder roller 16, may have any arbitrary construction. There may also be provided some suitable collecting means for the carrier papers of the foil cuttings 3 which are removed downstream of the deflection edge 8 and having each an advertising print or a commercial art remaining thereon. Such collecting means may finally be combined with any suitable application device by means of which the advertising prints or the commercial arts are taken up from the carrier papers and transferred to individual transfer foils which are used as auxiliary means for a self-adhesive application of the advertising prints or commercial arts to an advertising space.

I claim:

1. A method of stripping laminated foil cuttings formed with incisions in a cover foil which is adhered to a carrier paper by means of a self-adhesive bottom layer, said incisions forming an advertising print designed for being applied in a self-adhesive manner to an advertising space, said advertising print remaining on an upper surface of said carrier paper when a foil remainder of a said cover foil is removed from said carrier paper of the foil cuttings, the method comprising:

a transportation means for transporting said foil cuttings in a given transportation direction;

a cutting means being arranged along said given transportation direction and provided for cutting a forward edge of said foil cuttings with an obtuse angle as inclined in such a manner that an upper surface of said cover foil projects forwardly relative to a lower surface of said carrier paper of each foil cutting in said given transportation direction; and a branch point downstream of said cutting means along said given transportation direction and formed with a deflection edge on which said foil remainder of said cover foil of each foil cutting is removed from said carrier paper, said foil remainder being further transported in a transfer direction which is branched off from said given transportation direction whereas said carrier paper of each foil cutting is continued in said given transportation direction together with said advertising print which remains on its upper surface at said branch point.

2. A method according to claim 1, wherein said cover foil of each foil cutting is heated prior to removing the foil remainder for causing a shrinkage of the cover foil and thereby an enlargement of the cutting width of said incisions forming said respective advertising print to thereby improve a separation of said foil remainder from respective contours of said advertising print in the vicinity of said deflection edge when said foil remainder is being pulled off from said carrier paper of each foil cutting.

3. A method according to claim 1, wherein the boil remainder is pulled off from the carrier paper of each foil cutting by a transfer means which at the deflection edge takes hold of a forward edge portion of said foil cuttings for its subsequent transfer to a remainder roller for continuing the removal of the foil remainder from the carrier paper.

4. A method according to claim 3, wherein each foil cutting is contacted at the forward edge portion of the cover foil with a rubber elastic pad of said transfer means through its self-adhesive bottom layer in such a manner that by a movement of the transfer means relative to the deflection edge the foil remainder is removed from the carrier paper.

5. A device of stripping laminated foil cuttings formed with incisions in a cover foil which is adhered to a carrier paper by means of a self-adhesive bottom layer, said incisions forming an advertising space, said advertising print for being applied in a self-adhesive manner to an advertising space, said advertising print remaining on an upper surface of said carrier paper when a foil remainder of said cover foil is pulled off from said carrier paper of the foil cuttings, the device comprising:

a transportation means having a transportation table for supporting the foil cuttings and for transporting the same in a given transportation direction;

a cutting means being arranged along said given transportation direction and provided for cutting a forward edge of said foil cuttings with an obtuse angle as inclined in such a manner than an upper surface of said cover foil projects forwardly relative to a lower surface of said carrier paper of each foil cutting in said given transportation direction;

a deflection edge as arranged in said given transportation direction downstream of said cutting means and provided for pulling off from the carrier paper said foil remainder of said cover foil by its deflection into a transfer direction which is branched off from said given transportation direction while at the same time said advertising print which is formed with said incisions in said cover foil remains on the upper surface of the carrier paper;

a transfer means which at the deflection edge takes hold of a forward edge portion of said cutting and which pulls off said foil remainder next to said forward edge portion from said carrier paper in said branched off transfer direction in cooperation with said deflection edge while said carrier paper is continued in said given transportation direction together with said advertising print remaining on its upper surface; and a remainder roller for taking up said roll remainders from said transfer means.

6. A device according to claim 5, wherein said transfer means is provided with a rubber elastic pad to which said forward edge portion of said foil cutting will be adhered momentarily through its self-adhesive bottom for its subsequent transfer to said remainder roller and a following take-up of its adjacent foil remainder on said remainder roller.

7. A device according to claim 5, wherein said transfer means comprises a transfer slide which is movable along a guide rail whereby said transfer slide comprises a rubber elastic pad for momentarily adhering thereto said forward edge portion of said cover foil of each foil cutting and a subsequent transfer of its adjacent foil remainder to said remainder roller, said transfer slide being turnable around an axis parallel to a rotational axis of said remainder roller for securing this transfer of the foil remainder to the remainder roller.

8. A device according to claim 5, wherein a driving roller are in contact with the outer surface of said remainder roller and said remainder and said driver roller are supported on two individual links of a link arrangement which is guided in a guide slot, said guide slot guiding a rotational axis of said remainder roller and extending in a direction that forms an angle with said branched off transfer direction.

9. A device according to claim 5, wherein a brush means is arranged in the vicinity of said deflection edge for contacting the surface of the advertising print which remains on the carrier paper of each foil cutting when the foil remainder is being pulled off at said deflection edge.

10. A device according to claim 5, wherein a heating channel is provided in the vicinity of said cutting means for shrinking the cover foil of each foil cutting to thereby enlarge the cutting width of the incisions of the cover foil by which said advertising print is formed.

* * * * *